United States Patent [19]

Garlick, III

[11] Patent Number: 4,498,190
[45] Date of Patent: Feb. 5, 1985

[54] AQUATIC ANIMAL CONTAINING DEVICES

[76] Inventor: Fred W. Garlick, III, 3149 SE. Kensington St., Stuart, Fla. 33494

[21] Appl. No.: 539,177

[22] Filed: Oct. 5, 1983

[51] Int. Cl.³ .................... B65D 33/01; A01K 63/00
[52] U.S. Cl. .......................................... 383/28; 43/55; 119/3; 383/2; 383/96; 383/102
[58] Field of Search .................... 119/3; 43/55; 383/2, 383/28, 96, 102, 117, 67, 71

[56] References Cited

U.S. PATENT DOCUMENTS

| | | | |
|---|---|---|---|
| 2,323,318 | 7/1943 | Farkas | 43/55 |
| 3,168,887 | 2/1965 | Bodell | 119/3 |
| 3,381,408 | 5/1968 | Nishimora | 43/55 |
| 3,777,498 | 12/1973 | Andrews et al. | 383/102 X |
| 3,988,853 | 11/1976 | Hudkins | 43/55 |

Primary Examiner—Hugh R. Chamblee
Attorney, Agent, or Firm—Carroll F. Palmer

[57] ABSTRACT

A device for containing live aquatic animals, e.g., lobsters, fish, etc., after they have been caught comprises a open mesh bag clamped or tied to a tubular member behind its entrance opening. A flexible flap is cantilevered to the tubular member and structured so that its free end extends fully across the exit end of the tubular member. When an animal is caught, it is shoved into the tubular member flexing the flap and passing into the attached bag whereupon the flap snaps back over the exit end to prevent escape of the contained animal. The bag may have closeable end or side openings for removing animals therefrom and/or flexible, transparent panels to permit the contents of the bag to be viewed.

8 Claims, 9 Drawing Figures

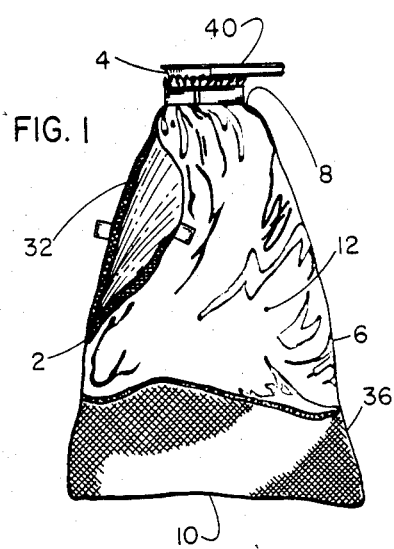
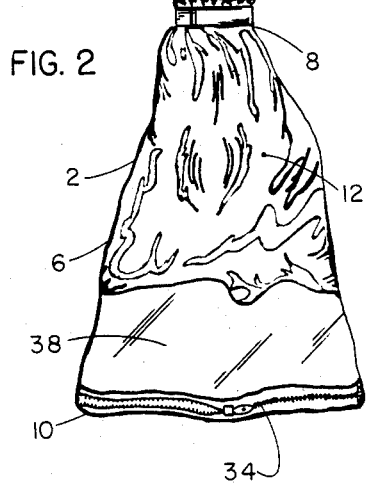
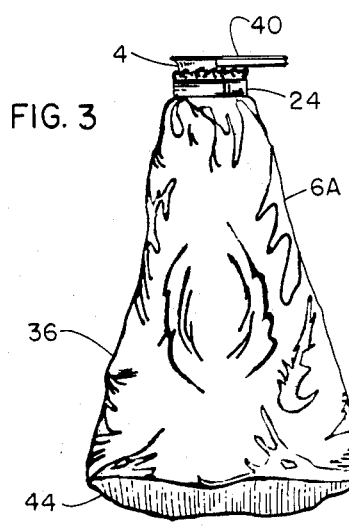
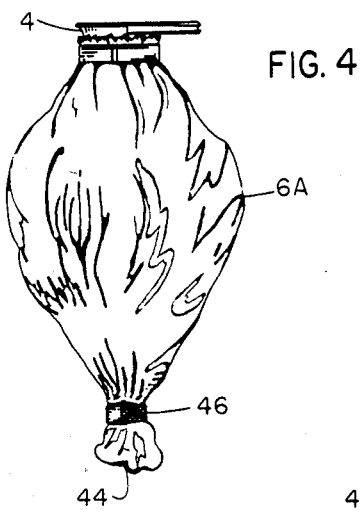
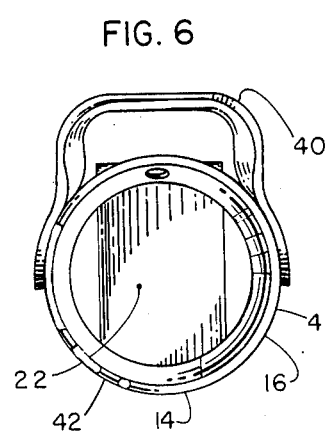
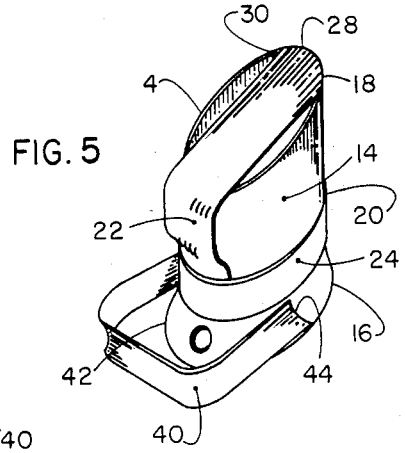
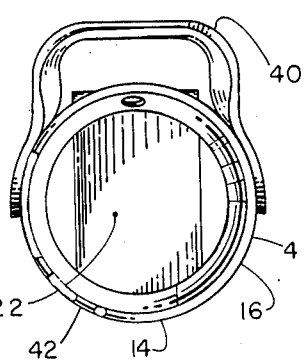
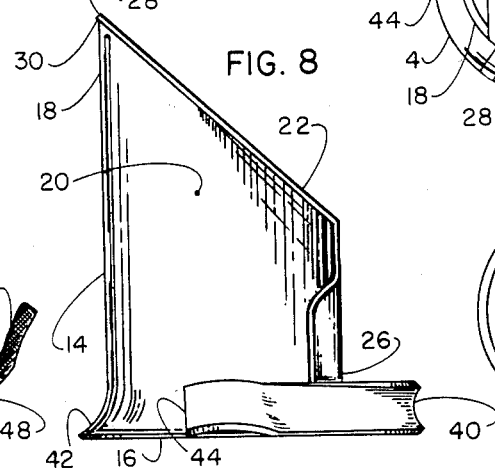
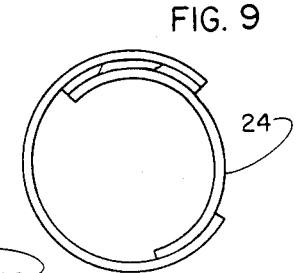

1

AQUATIC ANIMAL CONTAINING DEVICES

BACKGROUND OF THE INVENTION

1. Field of the Invention

This invention relates broadly to animal containing or holding devices. More particularly, it concerns devices in which live aquatic animals may be contained after they have been caught by a diver, fisherman or the like.

2. Description of the Prior Art

One widely practiced method of catching lobsters, other than with traps, is to dive on the reefs where they occur using scuba or snorkel gear. Once the animal has been caught, there is the problem of how to hold him so he doesn't escape and keep him alive while still other lobsters are sought.

Much the same problem occurs with catching fish, particularly where it is desired to keep the caught fish alive while the fishing continues.

The present invention provides a solution to these problems by using a mesh bag in which the caught animals may be contained with a unique, tubular entrance unit to permit easy stowage of a caught animal into the bag, but prevent the animal once in the bag from getting out the entrance.

The use of tubular members to assist in charging items into bags or other containers is, of course, well known. For example, U.S. Pat. No. 112,727 discloses a tubular, scoop type device to help in filling a bag.

U.S. Pat. No. 571,513 shows a somewhat similar tubular scoop for use in filing large bags with grain or the like.

U.S. Pat. No. 791,472 discloses a tubular unit about which a bag may be placed to both support the bag and assist in filling it.

U.S. Pat. Nos. 2,606,327 and 3,893,598 show that it is known to provide tubular filling assist devices with means to permits material to enter a container, but automatically prevent the charged material from exiting the container.

U.S. Pat. No. 2,605,582 discloses a conical device to be placed in the mouth of a jar or the like to form a trap for beetles or other insects that will enter through the device into the jar, but will be unable to get back out through the conical opening.

Finally, it is known to provide open mesh fish traps with trap entrance elements that will open when force is applied in the ingress direction, but immediately close to prevent movement in the exit direction through the entrance as shown by FIGS. 9 and 10 of U.S. Pat. No. 3,029,546.

OBJECTS

A principal object of this invention is the provision of new devices for the containment of live, aquatic animals. Further objects include the provision of such devices that are:

1. Simple and easy to use, particularly in adverse environments such as encountered by free swimming divers and to be useable even by one-armed divers.

2. Capable of being stored in a small space when not in use, but which provide a relatively large animal containment volume when in use.

3. Free of complicated elements that are costly to make or easily broken.

4. Will permit contained animals to be immersed in ambient water to remain alive as long as required by the diver, fisherman or other user of the devices and will allow new animals to be put in without contained animals escaping.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The foregoing objects are accomplished in accordance with the invention by the provision of a device for containing captured live aquatic animals that comprises an entrance unit and a mesh bag having an open end, a closed end and tubular central portion.

The entrance unit comprises (a) a tubular member having a proximal end and a distal end joined by a central body portion, (b) a flexible flap and (c) a ring clamp.

The proximal end of the tubular member defines a plane normal to the longitudinal axis of the member and the distal end defines a plane that is angled with respect to the axis.

The flexible flap is cantilevered at one end to the central body portion of the tubular member adjacent the proximal end and the other free end of the flap is substantially coincidental with the portion of the distal end most distal from the proximal end. The flap extends fully across the distal end.

The open end of the bag is held about the central body portion of the tubular member by the ring clamp or by a rope tie, plastic band or equivalent element.

In the preferred embodiments of the new devices, the bag has a closeable opening along its central portion that may be temporarily opened or, alternatively, the bag has a closeable opening along its closed end that may be temporarily opened to remove aquatic animals contained in the bag. Advantageously, the bag is formed from open mesh fabric made of plastic monofilament.

Also, the bag may have a flexible transparent panel in its central portion through which the contents of the bag may be viewed. Further, the device may include a handle projecting from the tubular member adjacent the proximal end. The tubular member may be flared outwardly at the proximal end, the handle may be U-shaped and its ends may both be fixed to the tubular member at the flared out portion.

BRIEF DESCRIPTION OF THE DRAWINGS

A more complete understanding of the invention may be obtained by reference to the attached drawing in which:

FIG. 1 is a perspective view of one embodiment of the combination bag and entrance unit devices of the invention.

FIG. 2 is a perspective view of another embodiment of the combination bag and entrance unit devices of the invention.

FIG. 3 is a perspective view of yet another embodiment of the combination bag and entrance unit devices of the invention.

FIG. 4 is a view similar to FIG. 3, but with the outlet end of the bag closed.

FIG. 5 is an isometric view of the entrance unit of the invention viewed from the distal end.

FIG. 6 is a longitudinal view of the entrance unit viewed from the proximal end.

FIG. 7 is a longitudinal view of the entrance unit viewed from the distal end.

FIG. 8 is a lateral view of the entrance unit minus the ring clamp.

FIG. 9 is a plan view of a ring clamp of the invention in open condition.

DESCRIPTION OF THE PREFERRED EMBODIMENTS

Referring in detail to the drawings in which identical elements are designated with the same numberal, a device 2 for containing captured live aquatic animals comprises an entrance unit 4 and a mesh bag 6 having an open end 8, a closed end 10 and tubular central portion 12.

The entrance unit 4 comprises a tubular member 14 having a proximal end 16 and a distal end 18 joined by a central body portion 20. It also has a flexible flap 22 and a ring clamp 24.

The proximal end 16 of the tubular member 14 defines a plane normal to the longitudinal axis of the member and the distal end 18 defines a plane that is angled with respect to the axis.

The flexible flap 22 is cantilevered at one end 26 to the central body portion 20 adjacent the proximal end 16 and the other free end 28 is substantially coincidental with the portion 30 of the distal end 18 most distal from the proximal end 16. The flap extends fully across the distal end.

The open end 8 of the bag 6 is held about the central body portion 20 of the tubular member 14 by the ring clamp 24 or by a rope tie (not shown), plastic band or equivalent element.

In the preferred embodiments of the new devices, the bag has a closeable opening 32 along its central portion 12 that may be temporarily opened or, alternatively, the bag has a closeable opening 34 along its closed end 10 that may be temporarily opened to remove aquatic animals contained in the bag. Advantageously, the bag is formed from open mesh fabric 36 made of plastic monofilament.

Also, the bag may have a flexible transparent panel 38 in it through which the contents of the bag may be viewed. Further, the device may include a handle 40 projecting from the tubular member 14 adjacent the proximal end 16. The tubular member 14 may have an outward flare 42 at the proximal end, the handle 40 may be U-shaped and its ends 44 may both be fixed to the tubular member 14 at the flared out portion 42.

In the embodiment of the invention shown in FIGS. 3 & 4, the bag 6a is substantially longer and smaller in diameter than the bags shown in FIGS. 1 & 2. A bag of this shape has been found to be helpful in reducing underwater drag when the new devices are used by scuba divers. Also, the lower end 44 of the bag 6a is fully open until it is bunlded shut (see FIG. 4) by the use of the "Velcro" strip 46 which is stitched at one end 48 into the side seam of the bag 6a. A piece of cord or string may be used instead of the strip 46 to close the end 44 of the bag 6a.

CONCLUSION

The new devices of the invention provide lobster divers, fishermen or the like a convenient, easy way to contain their catches in the live state throughout the diving or fishing period. For example, a scuba diver can carry the device by the handle 40 as he makes the rounds on a reef looking for lobster. As soon as one is caught, it is shoved into the end 16 of the entrance unit 4. The animal will flex the flap 22 and pass by it into the bag 6. The flap 22 will automatically return to its distal end closing position to prevent the animal from being able to leave the bag 6. When the diver wants to retrieve his lobster catch from the bag, one of the openings 32, 34 or 44, depending on which type bag is included in the device 2, will be opened and the lobsters dumped from the bag.

The same type operation can be used by fishermen to store fish alive until the end of the fishing. For fishing, the device may be immersed in the water beside a boat or dock by tying a cord to the handle 40, or if no handle is provided on the device 2, a cord can be tied around the bag adjacent the clamp 24.

The devices 2 may be formed in a variety of sizes to accommodate the type and size of aquatic animals that are to be caught and contained. For example, the tubular members 14 would be four to six inches in diameter for use in containing average size lobsters or fish. Also, although the tubular members 14 are shown as sections of circular tubing, they may be of oval or other desired configuration. Plasticized polyvinyl chloride plastic has been found to be a desirable material for construction of the tubular members 14 and the flaps 22. Open mesh fabric made from nylon or polyolefin monofilament are good materials from which to make the bags 6.

One advantage of the new animal retainers over related prior devices is the ability of the diver or other user to insert a lobster or other animal to be retained using only one hand. This allows the other hand of the user to attend to some other task, e.g., hold onto the edge of a reef, etc. and permits one-armed users to successfully use the devices.

Another advantage of the new devices is their ability to permit new lobsters or other animals to be inserted for retension without possibility for those already in the device to escape. In contrast, tie-type bags and other prior lobster retainers, often have allowed one or more previously caught lobsters to escape in the course of trying to put a new one in the bag.

The embodiments of the invention in which an exclusive property or privilege is claimed are defined as follows:

1. A device for containing live aquatic animals comprising:
   an entrance unit and
   a mesh bag having an open end, a closed end and tubular central portion,
   said entrance unit comprising:
   a tubular member having a proximal end and a distal end joined by a central body portion, said proximal end defining a plane normal to the longitudinal axis of said member and said distal end defining a plane that is angled with respect to said axis,
   a flexible flap cantilevered at one end to said central body portion of said tubular member distally of said proximal end, the other free end of said flap being substantially coincidental with the portion of said distal end most distal from said proximal end, said flap extending fully across said distal end, and
   a bag holding means, said open end of said bag being held about said central body portion of said tubular member by said holding means.

2. The device of claim 1 wherein said bag has a closeable opening along its central portion that may be temporarily opened to remove aquatic animals contained in said bag.

3. The device of claim 1 wherein said bag has a closeable opening along its closed end that may be temporarily opened to remove aquatic animals contained in said bag.

4. The device of claim 1 wherein said bag has a flexible transparent panel in its central portion through which the contents of the bag may be viewed.

5. The device of claim 1 that includes a handle projecting from said tubular member adjacent said proximal end.

6. The device of claim 5 wherein said tubular member is flared outwardly at said proximal end, said handle is U-shaped and the ends thereof are both fixed to said tubular member at said flared out portion.

7. The device of claim 1 wherein said bag is formed from open mesh fabric made of plastic monofilament.

8. The device of claim 1 wherein said bag holding means is a ring clamp.

* * * * *